United States Patent [19]

Hertz et al.

[11] Patent Number: 4,873,117
[45] Date of Patent: Oct. 10, 1989

[54] STAINLESS STEEL TUBULAR ELEMENT WITH IMPROVED WEAR RESISTANCE

[75] Inventors: Dominique Hertz, Tassin; Jean-Michel Couturier, Villeurbanne, both of France

[73] Assignees: Framatome, Courbevoie; Compagnie Generale Des Matieres Nucleaires, Villacoublay, both of France

[21] Appl. No.: 97,984

[22] Filed: Sep. 18, 1987

[30] Foreign Application Priority Data

Sep. 18, 1986 [FR] France ................................ 86 13078

[51] Int. Cl.$^4$ .......................... B05D 3/06; G21C 7/10
[52] U.S. Cl. ......................................... 427/37; 427/38; 427/309; 427/399; 376/327; 376/900; 376/305
[58] Field of Search .................. 427/37, 38, 399, 309; 376/327, 414, 416, 417, 900, 305

[56] References Cited

U.S. PATENT DOCUMENTS

| | | | |
|---|---|---|---|
| 3,615,885 | 10/1971 | Watson et al. | 376/416 |
| 4,242,151 | 12/1980 | Leveque | 427/38 |
| 4,333,808 | 6/1982 | Bhattacharyya et al. | 427/38 |
| 4,411,861 | 10/1983 | Steinberg | 376/417 |
| 4,450,374 | 5/1984 | Cho et al. | 427/38 |
| 4,606,109 | 8/1986 | Weiss | 376/327 |
| 4,613,400 | 9/1986 | Tom et al. | 427/38 |
| 4,636,266 | 1/1987 | Asay | 376/305 |
| 4,704,168 | 11/1987 | Salik et al. | 427/38 |
| 4,711,756 | 12/1987 | Nakazato | 376/327 |
| 4,728,488 | 3/1988 | Gillet et al. | 376/327 |
| 4,745,031 | 5/1988 | Nakayama et al. | 427/39 |
| 4,749,587 | 6/1988 | Bergmann et al. | 427/37 |
| 4,762,728 | 8/1988 | Keyser et al. | 427/38 |

FOREIGN PATENT DOCUMENTS

| | | | |
|---|---|---|---|
| 735586 | 5/1966 | Canada | 376/305 |
| 0036469 | 3/1979 | Japan | 376/305 |

OTHER PUBLICATIONS

Materials Sci. & Eng., vol. 40, No. 2, 1979, pp. 261–263.
J. Vac. Sci. Technol., vol. 15, No. 2, Mar./Apr. 1978, pp. 313–317, Jindal.

Primary Examiner—Harvey E. Behrend
Attorney, Agent, or Firm—Pollock, Vande Sande & Priddy

[57] ABSTRACT

A sheath for a nuclear reactor control rod consists of chromium nickel stainless steel. It is protected against friction wear by nitridation over a depth of from 15 to 50 μm obtained by an electric discharge in a nitrogen containing atmosphere.

8 Claims, 1 Drawing Sheet

STAINLESS STEEL TUBULAR ELEMENT WITH IMPROVED WEAR RESISTANCE

BACKGROUND OF THE INVENTION

1. Technical Field

The invention relates to tubular elements of chrome-nickel stainless steel designed to be used in the high pressure and high temperature water in water cooled and moderated nuclear reactors.

In such reactors the cooling water frequently contains boron products and is in contact with tubular elements some of which are frequently slidingly moved within and along guides on which they rub. This occurs in particular with stainless steel sleeves of reactivity control rod clusters. To control the reactivity of the reactor, the control rods are moved along guide tubes provided in the fuel assemblies and along guides placed in the upper internals of the reactor. The frequency and the amplitude of the movements of certain rods, particularly when the reactor is used in the "load follower" mode are such that it has often been necessary to systematically replace a certain number of clusters on each core reloading.

2. Prior Art

It has already been proposed to deposit a coating on the outer surface of tubular elements subject to friction to reduce the wear thereof. Electrolytic platings of hard chromium and chemical platings of nickel have already been produced. Electrolytic chromium platings are fragile. Chemically deposited nickel may contaminate the primary circuit of the reactor. Coatings containing chromium carbide to which a nickel-chromium bonding alloy is added have poor behavior under irradiation.

SUMMARY OF THE INVENTION

It is an object of the invention to improve the resistance to frictional wear of stainless steel tubular elements. It is another object to increase their resistance to thermal cycling and to preserve the properties under irradiation in a water cooled reactor.

According to the invention there is provided a tubular element of chrome-nickel stainless steel, typically a control-rod sheath for a nuclear reactor, whose outer surface is nitrided to a depth comprised between 15 and 40 microns.

Nitridation is advantageously carried out ionically. The tubular elements are subjected to a plasma created by electrical discharge in a low pressure atmosphere containing nitrogen and hydrogen, to implant active nitrogen ions, at a sufficiently high temperature to cause in-depth diffusion of the ions.

It is desirable, to avoid sensitization of the material due to a dechromization of the matrix of the tubular elements which would be detrimental to the corrosion resistance in an oxidizing medium, to adopt durations and temperatures of treatment sufficiently low so that the processed layer does not exceed 40 um. In practice, it is possible to operate at a temperature of about 500° C., for a period of some hours.

For further increasing the resistance to wear, the element may be superficially passivated ionically. Passivation may consist in maintaining the nitrided element in an oxidizing plasma at a temperature lower than 500° C. during a time duration so selected that the passivated thickness does not exceed the nitrided thickness and longer than 1 hour.

The invention will be better understood from the following description of a particular embodiment of the invention, given by way of example. The description refers to the accompanying drawings:

DETAILED DESCRIPTION OF AN EMBODIMENT

Figure 1:
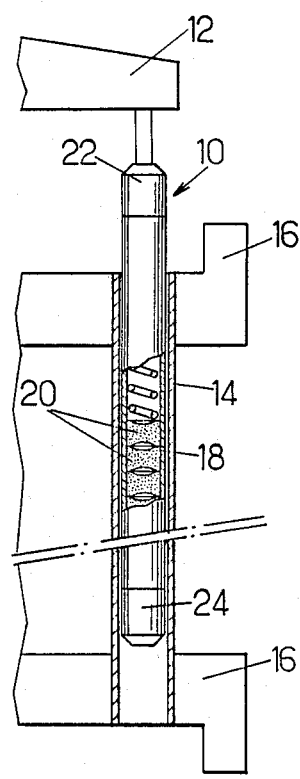
FIG. 1 is simplified view of a rod of a control cluster provided with a sheath which may be treated according to the invention.

FIG. 1 shows a rod 10 of a pressurized water nuclear reactor control cluster. Rod 10 and other rods are fixed to arms of a spider 12 for simultaneous vertical movement of the rods. The rods slide in guide tubes 14 belonging to a fuel assembly and connecting the end nozzles 16.

Each rod comprises a sheath or sleeve 18 of chrome-nickel stainless steel, frequently of AISI 304 steel, the principal components of which are as follows: Ni: 8.50 to 11% wt; Cr:17 to 19% wt; carbon: 8% wt maximum; Mn:2% wt maximum. The remainder is iron except for the unavidable impurities. Pellets 20 (or a slug) of neutron absorbing material are stacked within the sleeve. The latter is sealingly closed by an upper plug 22 and a lower plug 24, also of stainless steel.

By way of example, the sleeve 18 can have an outer diameter of 9 to 25 mm and a thickness of from about 0.4 mm to 1.5 mm. The sleeve will be thicker when the diameter is greater.

To reduce wear and tear of the sheath 18 when it frictionally slides on the guide tube 14, which in general is also of stainless steel, it is superficially nitrided, to a depth comprised between 15 and 40 um, typically between 20 and 40 um.

Figure 2:
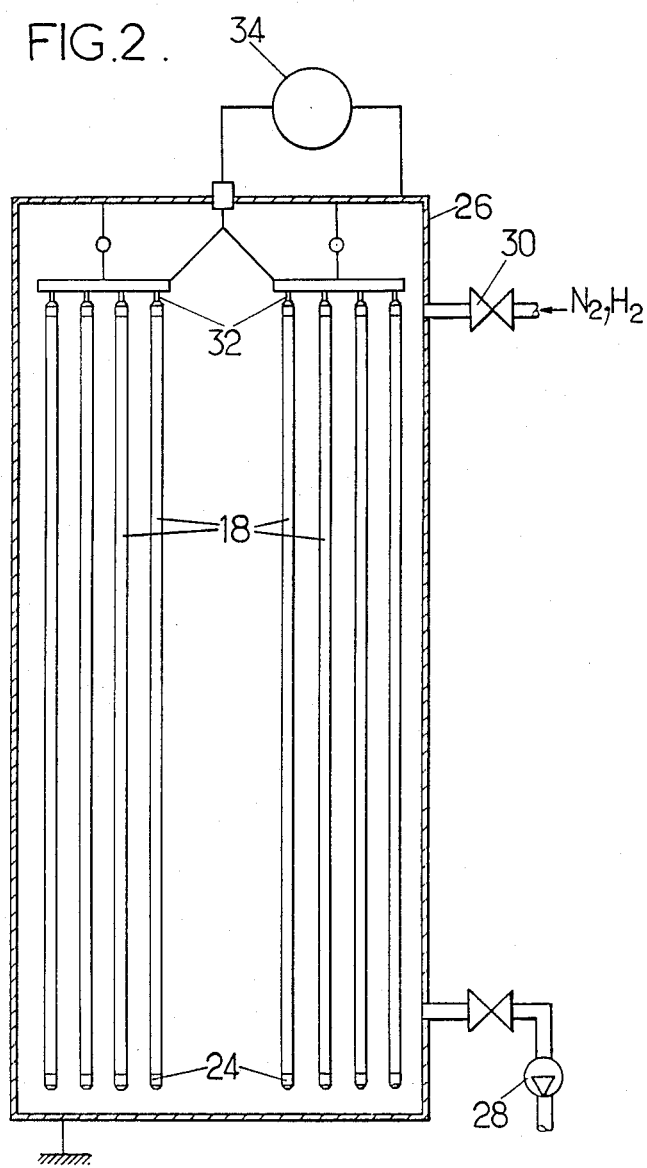
FIG. 2 shows very diagrammatically a sheath processing installation according to an embodiment of the invention.

Nitridation may be carried out in a device as shown diagrammatically in FIG. 2. The apparatus of FIG. 2 comprises a sealed enclosure 26 provided with a vacuum pump 28 for reducing the pressure therein to a value usually comprised between 30 and 200 Pascals and with an inlet pipe for introducing a mixture of nitrogen and hydrogen. The enclosure 26 contains a framework for receiving a charge consisting of several sleeves to be processed. The sequence of operations can then be as follows:

The sleeves to be processed are cleaned, then fitted with their lower plug 24. A thermal buffer body, which can be constituted by a slug of stainless steel, is placed in each sleeve and then a temporary upper plug 32 is fixed on each sleeve. The plug is used for holding the sleeve during coating. The sleeves are placed in the enclosure and their portions close to the upper plugs are advantageously masked to avoid nitridation of the stainless steel in these zones.

The parts are ionically etched in the enclosure 26 under a pressure of about 30 Pa. Then the enclosure is scavenged and an atmosphere of nitrogen and hydrogen under a low pressure (the total pressure not exceeding 200 Pa and the nitrogen partial pressure being for example 40–60 Pa) is created. A voltage of 300 V to 1000 V is created by a generator 34 across the metal enclosure 26 and the sleeves to be treated. The active nitrogen ions formed by dissociation of the gaseous mixture by the electrical discharge are implanted by ionic bombardment on the surface of the sleeves 18. Means (not shown) which can be conventional are provided to maintain the sleeves at a temperature above ambient, but below 510° C. (typically about 500° C.) over their whole length and to cause diffusion of the nitrogen ions. The operation is continued until the depth of the implantation reaches the desired value. In practice, the duration of treatment does not exceed 6 hours.

The enclosure is scavenged again and is filled with an oxidizing atmosphere containing oxygen, under a pressure of about the same value as during nitridation. A plasma, which then contains active oxygen ions, is generated for limited oxidation of the nitrided layer. The step may be carried out at a temperature of from 400° to 480° C., for a period sufficient for obtaining an appropriate passivation. As a rule, the duration will be higher than one hour and lower than that which would passivate the metal over a depth higher than that attained by the nitrogen ions.

The sleeves are then taken out of the enclosure. The temporary upper plugs are removed, the sleeves are loaded wtih absorbent material and the final upper plug is placed.

In a modification, the sleeves are loaded with neutron absorbing material and closed before ionic nitridation.

The invention is applicable to tubular elements for use in nuclear reactors other than control rod sleeves. It can particularly be used for clusters of rods having another function and whose surfaces must withstand frictional or vibration wear. It is further possible to subject the internal surface of tubes subject to friction of a part which slides therein, to a similar treatment.

We claim:

1. A process for manufacturing a control rod sheath for a water-cooled and moderated nuclear reactor, comprising the steps of:
   providing a chromium-nickel stainless steel sleeve;
   closing said sleeve with plugs;
   maintaining said sleeve in a nitrogen-hydrogen atmosphere under a reduced pressure of from 30 to 200 Pascals; and
   striking an electric discharge in said atmosphere for generating nitrogen ions until only a radially outer surface of said sleeve is nitrided over a depth of from 15 to 40 um.

2. A process for manufacturing a control rod sheath for a water-cooled and moderated nuclear reactor, comprising the steps of:
   providing a chromium-nickel stainless steel sleeve;
   closing said sleeve with plugs;
   maintaining said sleeve in an enclosure containing a nitrogen-hydrogen atmosphere under a reduced pressure of from 30 to 200 Pascals;
   striking an electric discharge in said atmosphere for generating nitrogen ions until only a radially outer surface of said sleeve is nitrided over a depth of from 15 to 40 um; and
   superficially passivating said sleeve by substituting an oxidizing atmosphere for said nitrogen-hydrogen atmosphere immediately after nitridation and generating a plasma in said oxidizing atmosphere at a temperature of from 400° C. to 480° C. for a time duration higher than one hour and lower than that which would passivate the steel over a depth greater than the nitrided depth.

3. A process according to claim 1, wherein an upper portion of the sleeve is masked during nitridation to avoid nitridation of the stainless steel in said upper zone close to an upper one of said plugs.

4. A process according to claim 2, wherein an upper one of said plugs closing said sleeve is a temporarily located upper plug and wherein a plurality of sleeves are simultaneously located in said enclosure, said sleeves being suspended by the temporary upper plugs thereof to a common framework, said electric discharge being struck by connecting a generator across said enclosure and said framework.

5. Process according to claim 1, wherein nitridation is for a duration of up to six hours at a temperature not exceeding 510° C.

6. Process according to claim 1, comprising the preliminary step of ion etching the sleeve in an enclosure before the nitridation step in said enclosure.

7. Process according to claim 1, wherein said sleeves are filled with a thermal buffer body and closed before the nitridation step.

8. Process according to claim 1, wherein said sleeves are loaded with neutron absorbing material and closed before nitridation.

* * * * *